(12) United States Patent
Förborgen

(10) Patent No.: US 6,256,893 B1
(45) Date of Patent: Jul. 10, 2001

(54) ELECTRIC VEHICLE POWER STEERING SYSTEM WITH A POSITION CALIBRATING DEVICE

(75) Inventor: Carl Erik Mikael Förborgen, Tyresö (SE)

(73) Assignee: Atlas Copco Controls AB, Stockholm (SE)

( * ) Notice: Subject to any disclaimer, the term of this patent is extended or adjusted under 35 U.S.C. 154(b) by 0 days.

(21) Appl. No.: 09/389,336

(22) Filed: Sep. 3, 1999

(30) Foreign Application Priority Data

Sep. 11, 1998 (SE) .................................................. 9803094

(51) Int. Cl.[7] ............................. G01B 11/26; B62D 15/02
(52) U.S. Cl. ................................ 33/1 PT; 33/1 N; 33/707
(58) Field of Search ................................ 33/1 PT, 1 N, 33/706, 707, 534

(56) References Cited

U.S. PATENT DOCUMENTS

| | | | |
|---|---|---|---|
| 4,626,682 | * 12/1986 | Hara et al. | 33/1 PT |
| 4,859,860 | * 8/1989 | Poterala | 33/1 PT |
| 5,218,769 | * 6/1993 | Tranchon | 33/1 PT |

* cited by examiner

*Primary Examiner*—Christopher W. Fulton
(74) *Attorney, Agent, or Firm*—Frishauf, Holtz, Goodman, Langer & Chick, P.C.

(57) ABSTRACT

A power steering system intended for a vehicle having at least one steerable wheel (50) and including an electric servo motor (56), a wheel position related steering control unit (58), and a control unit calibrating device (55,61) for identifying the straight-ahead position of the steerable wheel (50) as the latter is turned within a steering interval defined by a first extreme end position (A) and a second extreme end position (B), wherein the calibrating device comprises a disc shaped element (55) which is rotatable about a central axis (X) in a conjoint relationship with the steerable wheel (50) and provided with a pattern of open and closed portions (64–67,70,71) and a single immobile sensor (61) for producing digital signals in response to its alignment with the open and closed portions (64–67,70,71), wherein a reference point (Y) corresponding to the straight-ahead position of the wheel (50) is defined by the transition from one open portion (64) to one closed portion (65) of the disc shaped element (55). The open and closed portions (64–67,70,71) are arranged on the disc element (55) so as to define in co-operation with the single sensor (61) the extreme end positions (A,B) of the steering interval. The calibrating device (55,61) is arranged to provide a continuously repeated check of its own operation order as well as the control unit (58) calibration.

18 Claims, 3 Drawing Sheets

ELECTRIC VEHICLE POWER STEERING SYSTEM WITH A POSITION CALIBRATING DEVICE

BACKGROUND OF THE INVENTION

This invention relates to an electric vehicle power steering system having an electric servo motor and a control unit for controlling the steering movements of the steerable wheel or wheels of the vehicle by an angle related operation of the servo motor, and a position calibrating device including a disc shaped element rotatable about a central axis in a conjoint relationship with the steerable wheel or wheels as they are turned within an intended steering interval defined by a first extreme position and a second extreme position, wherein the disc shaped element has one or more peripherally extending open and closed portions defining a reference point corresponding to the straight-ahead position of the steerable wheel or wheels as well as points corresponding to the extreme end positions of the steerable wheel or wheels and co-operating with an immobile sensing means for producing digital signals in response to the straight-ahead or extreme end positions passing the sensing means.

In a previously well known type of electric power steering system there is comprised a device having two mechanical switches activated by a rotating member for obtaining indications of the extreme end positions of the steerable wheel or wheels. A problem concerned with this type of device is that the end position switches are activated quite seldom, and there is a risk that they may become malfunctioning due to too little use. This means that the steering interval of the vehicle wheel or wheels may be extended beyond set up safety limits, which would be hazardous to the operation safety of the vehicle, in particular when starting-up the vehicle. In some applications mechanical stops are employed to limit the steering interval, which means that when mechanically stopped the steering drive is stalled and an overload safety means is activated.

In another prior art power steering system the position of the wheel or wheels is controlled and monitored by an angle sensor associated with the servo motor of the system. This is combined with a calibration means for identifying a reference point when starting up the system and for enabling a repeated checking of the angle sensor calibration during operation of the vehicle. This known device comprises a disc shaped element which rotates conjointly with the steerable wheel or wheels of the vehicle and which is provided with a semi-circular slot, and two contact-free digital sensors arranged to detect the ends of the slot. One of the sensors indicates repeatedly a reference point corresponding to the straight-ahead position of the wheel or wheels, whereas the other sensor indicates the two extreme end positions of the intended steering interval. A drawback of this known device is the need of two sensors to obtain a proper information of the actual wheel positions, which means two sources of possible malfunction.

The above mentioned problems and disadvantages are overcome by the invention.

SUMMARY OF THE INVENTION

It is a primary object of the invention to provide an improved electric power steering system in which the servo drive includes an angle sensor for monitoring the steering movements and in which there is provided a position calibrating device having a disc shaped element conjointly rotating with the steerable wheel or wheels of the vehicle, and a single digital sensor for indicating repeatedly at steering movements a reference point on the disc shaped element corresponding to the straight-ahead position of the steerable wheel or wheels. This means an increased system operation safety.

Further objects and advantages of the invention will be described below with reference to the accompanying drawings.

DETAILED DESCRIPTION

Figure 1:
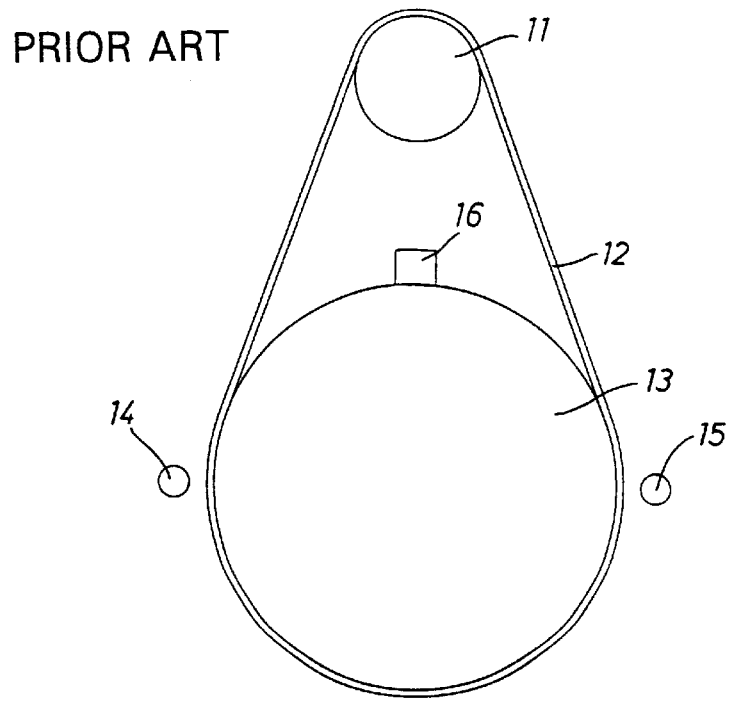
FIG. 1 shows schematically a prior art power steering system comprising two end position switches.

In the previously well known and commonly used power steering system mentioned above and illustrated in FIG. 1, which is intended for electric vehicles like fork lift trucks, an electric servo motor 11 is drivingly connected to a wheel turning disc element 13 by means of a drive belt 12, see FIG. 1. The disc element 13 is arranged to rotate in a conjoint relationship with the steerable wheel or wheels of the vehicle and is provided with an actuating finger 16 intended to co-operate with two end switches 14,15 so as to stop the steering movement and, thereby, prevent steering outside a predetermined steering interval. The servo motor 11 is actuated in response to a command signal delivered by a remotely located driver operated steering wheel device, but there is no safety means provided for monitoring the actual steering angle. However, to prevent steering outside the predetermined steering interval the switches 14,15 are activated by the finger 16 to, thereby, stop the servo motor 11. This may be combined with mechanical abutments to positively block further steering movement as the extreme end positions are reached.

Figure 2:
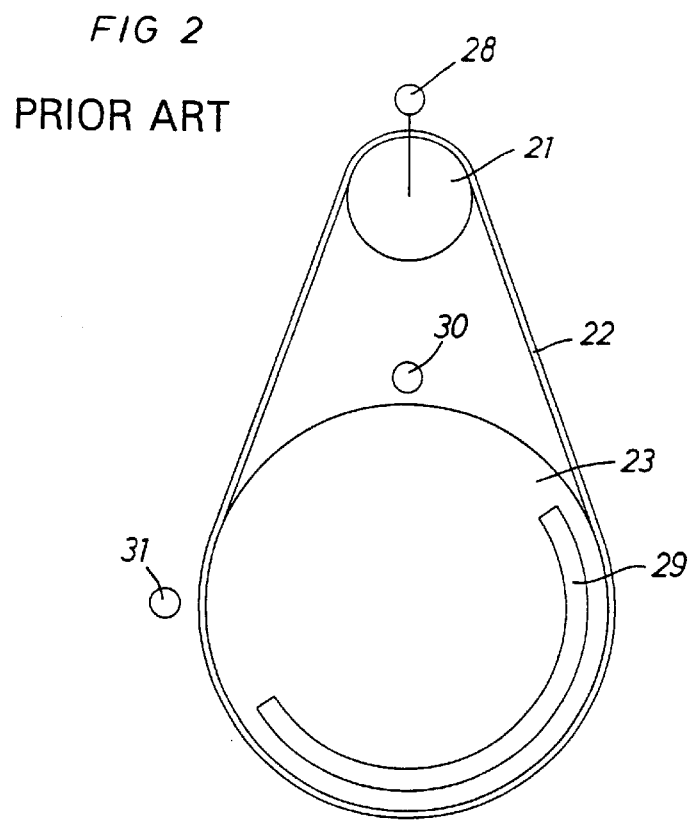
FIG. 2 shows schematically another prior art power steering system having an angle responsive drive and two position sensors.

In the more advanced power steering system also mentioned above and illustrated in FIG. 2, a servo motor 21 is drivingly coupled to a rotatable disc element 23 via a drive belt 22 as in the previously described example. In this system, however, the servo motor 21 is provided with an angle sensor 28 to enable a continuous monitoring of the actual angle of the steerable wheel or wheels of the vehicle. In order to calibrate the angle sensor 28, at starting-up of the system and/or repeatedly during operation, the disc element 23 is provided with a semicircular slot 29, and two digital sensors 30,31 are provided to detect the straight-ahead position as well as the extreme end positions of the steering interval by detecting the ends of the slot 29. One of the sensors 30 is located so as to detect the end of the slot 29 in the straight-ahead position of the steerable wheels of the vehicle, whereas the other sensor 31 is located at a 90 degree distance from the first sensor so as to detect the extreme end positions of the steering interval.

Since the straight-ahead sensor 30 of this known device is frequently activated due to steering movements often passing the straight-ahead position, there is obtained a continuous function check of this sensor. The end position sensor 31, however, is activated relatively seldom, which means that it may be out of order for some time interval without the system being informed. This means in turn that a hazardous oversteering, i.e. steering movement beyond the predetermined extreme end positions, may be made. To this drawback comes the fact that a second sensor for end position indication adds extra cablage and connections, which means an increased risk for malfunction of the system.

In contrast to the above described prior art systems, the power steering system according to the invention incorporates an increased safety level in that the number of error sources is reduced. In particular, the power steering system according to the invention comprises a single position sensor only for system calibration purposes as well as end position detection.

Figure 3:
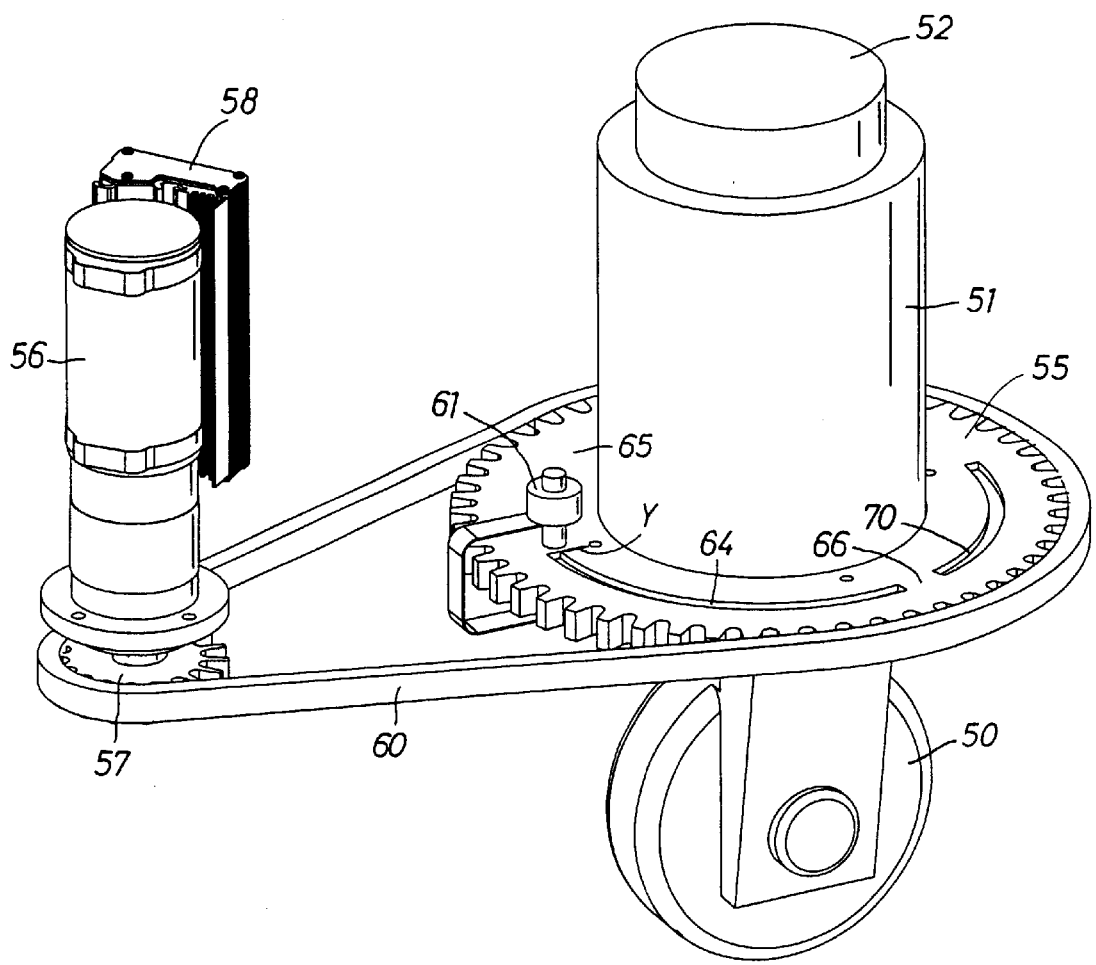
FIG. 3 illustrates in a perspective view a power steering system according to the invention.

A power steering system according to the invention is illustrated in FIG. 3 in an electric truck application, for instance a fork lift truck, which comprises at its one end a single wheel 50 for supporting, propelling and steering the truck. The entire truck is not illustrated, but the wheel 50 is shown together with the truck traction motor 51, a truck braking mechanism 52 and the power steering system according to the invention. The power transmission between the motor 51 and the wheel 50 is of no significance to the invention and is therefore not illustrated. An electric vehicle like the above described truck also has an operation control system (not shown) by which the traction motor 51 is operated in response to operator commands as well as safety restrictions relating to the actual load magnitude, load lift hight etc.

The power steering system is formed integrally with the traction wheel assembly and comprises a disc shaped element 55 which forms a support means for the traction motor 51 and which is conjointly rotatable with the wheel 50 about an axis X at steering movements. The power steering system comprises an electric servo motor 56 with a drive pinion 57, a programmable control unit 58, and the disc shaped element 55. The latter is formed as a gear wheel which is coupled to the motor pinion 57 via drive belt 60.

The control unit 58, which is clamped onto the motor 56, comprises a power stage for supplying motive power to the servo motor 56, and a micro processor for governing the servo motor operation in response both to command signals received from an operator controlled steering wheel or handle, and to safety parameter values programmed into the micro processor.

In this example, the servo motor 56 is of the brush-less synchronous type having a permanent magnet rotor and a rotor position detector in the form of an angle sensor (not shown). This integrated angle sensor makes it possible to rotate the motor rotor as well as the steerable wheel 50 for desired angles within a certain predetermined safety interval. However, a decisive condition for operating the steering system within specific safety limits programmed into the control unit is a correct identification of the straight-ahead position of the wheel 50 and a subsequent calibration of the control unit 58. Another condition is to get safe and correct indications of the extreme ends of the predetermined steering interval.

In order to obtain a safe and correct indication of the straight-ahead position of the wheel 50, there are provided open portions or apertures in the form of part-circular slots 64,67,70 in the disc element 55, and an immobile sensor 61 is arranged to detect the presence or absence of the slots at the location of the sensor and to deliver digital signals in response thereto. The slots 64,67,70 are of different length but are located on the same radius Z from the rotation axis X.

Figure 4:
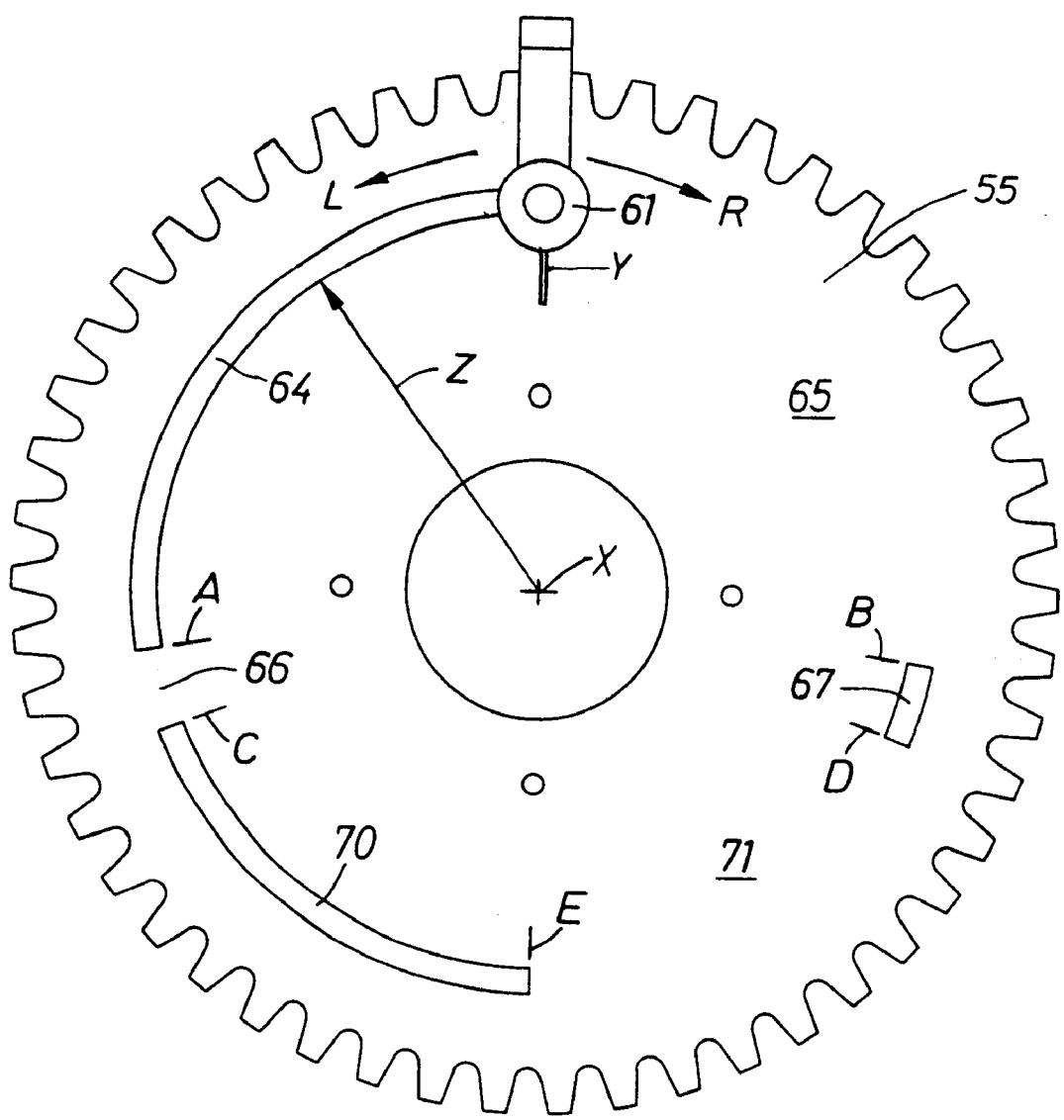
FIG. 4 shows a disc shaped element and a position sensor according to the invention.

As illustrated in FIG. 4, the slotted disc element 55 provides circumferentially extending open portions and closed portions to be aligned with the sensor 61 in relation to the actual position of the disc element 55 and the wheel 50. On the disc element 55 there is a reference point Y which corresponds to the straight-ahead position of the wheel 50. This reference point Y is defined by one end of a first slot shaped open portion 64 which in this example extends over an angular interval of 100 degrees. In the opposite direction, there is a first closed or unslotted portion 65 of the disc element 55 extending from the reference point Y over about 100 degrees. The ends of these two portions 64,65 define the extreme end positions A,B of the maximum available steering interval.

At the end of the first open portion 64, i.e. the extreme end position A of the steering interval, there is a second closed portion 66 which in this example extends over an angle of 12 degrees. This means that this second closed portion extends to a point C which is located 12 degrees beyond the extreme end position A.

At the end of the first closed portion 65, i.e. the opposite extreme end position B of the available steering interval, there is a second slot shaped open portion 67 which extends over an angle of 12 degrees. Accordingly, this second open portion 67 extends to a point D which is located 12 degrees beyond the extreme end position B.

A third slot shaped open portion 70 extends over at least 20 degrees from the end point C of the second closed portion 66 to a point E. This leaves a third closed portion 71 extending between the end point D of the second open portion 67 and the end point E of the third open portion 70.

In FIG. 4, the two opposite directions of rotation for the disc element 55 at steering the vehicle in various directions are illustrated by the arrows L for left hand turning, and R for right hand turning. When turning to the right, i.e. rotating the disc element 55 in direction of the arrow R, the first open portion 64 will come into alignment with the sensor 61 making the latter produce a signal having a negative sign. At continued activation of the steering system for turning the vehicle further to the right, i.e. continued turning the disc element 55 in the direction of the arrow R, the extreme end point A will reach the sensor 61. Then, the sensor signal will change to a positive sign because of the closed portion 66 coming into alignment with the sensor 61. This will be the case during continued right hand rotation of the disc element 55 through the second closed portion 66.

At further right hand rotation of the disc element 55, the end point C of the open portion 70 causes the sensor signal to change sign from positive to negative, because the open portion 70 now comes into alignment with the sensor 61.

At still continued rotation of the disc element 55 in the right hand direction, the end point E of the third open portion 70 will be aligned with the sensor 61, whereby again a signal with a positive sign will be produced.

When instead activating the steering system in the opposite direction, starting from the reference point Y, the closed portion 65 of the disc element 55 will be aligned with the sensor 61, thereby making the latter produce a signal with a positive sign. When reaching the left hand extreme position B, the sensor 61 starts producing a signal with a negative sign, because at continued rotation beyond the end position B of the normal steering interval the open portion 67 comes into alignment with the sensor 61. When at still further rotation the second open portion 67 has passed the sensor 61, the produced sensor signal changes its sign back to positive. The positive signal will last as long as the third closed portion 71 is in alignment with the sensor 61, i.e. until the meeting point E between the closed portion 71 and the third open portion 71 is reached.

The above described pattern of open and closed portions of the disc element 55 makes it possible for the control unit to detect and identify by means of a single sensor the straight-ahead wheel position as well as the extreme end positions of the predetermined availabe steering interval. This means not only a simplification of the power steering system per se, but means a significant reduction of the possible sources of error that might cause malfunction of the system.

When starting up the system, a calibration cycle is initiated in order to calibrate the signals delivered by the angle sensor of the motor 56. This is carried out either automatically by a calibration cycle loop programmed in the control unit 58 micro processor or by a manual test sequence carried out by the operator. During this test cycle, the servo motor 56 is rotated over a certain angular interval, whereby the sensor 61 is able to scan the pattern of the closed and open portions of the disc element 55. The information obtained during this scanning operation is used to identify the reference point Y and, hence, the straight-ahead position of the wheel 50. The calibration cycle is carried out with the traction motor 51 and the wheel 50 locked by the brake mechanism 52.

A preferable way to obtain a calibration of the system in relation to the reference point Y is to rotate the wheel 50 assembly over angular intervals of about 20 degrees in opposite directions, whereby the pattern of open and closed portions on the disc element 55 will activate the sensor 61 in a certain way.

If the wheel 50 and the disc element 55 are in the position illustrated in FIG. 4, a right hand turn of the wheel 50, i.e. as shown by arrow R, will make the sensor 61 coincide with the open portion 64 and produce a negative signal all the way up to the point A. This is o.k. A left hand turn of the wheel 50 starting from the original position in which the sensor 61 is aligned with the reference point Y, as illustrated in FIG. 4, will make the sensor 61 coincide with the closed portion 65 and, thereby, produce a positive signal all the way up to point B. This is also o.k. Now the control unit is able to determine that the transition point between the open portion 64 and the closed portion 65 in fact is the reference point Y, which corresponds to the straight-ahead position of the wheel 50.

However, should the wheel 50 be in a position wherein the sensor 61 is aligned with, for instance, point C when the calibration procedure starts, a right hand turn exceeding 20 degrees would make the sensor 61 produce a negative signal up to point E, which is more than 20 degrees and would be o.k. A left hand turn on the other hand, starting with the sensor 61 coinciding with point C, would make the sensor 61 produce a positive signal up to point A and then change to a negative signal when coming into alignment with the open portion 64. Since the positive signal is produced during rotation over an angular interval which is considerably less than 20 degrees, there would be no o.k.-signal.

Starting the calibration procedure from, for instance, a position wherein the sensor 61 is aligned with point A, a right hand turn over about 20 degrees would make the sensor produce a positive signal over just 12 degrees, i.e. up to point C, and then change to a negative signal. This would not be o.k.

A calibration procedure starting with the sensor 61 aligned with point E would result in a positive signal from the sensor 61 over 20 degrees during a right hand turn of the wheel 50, which would not be o.k. A left hand turn would result in negative signal all the way up to point C, which would neither be o.k. The control unit is now able to determine that the reference point Y and the straight-ahead wheel position is in a position diametrically opposite to point E.

Since, during operation of the truck, the reference point Y passes the sensor 61 frequently during normal operation of the steering system, it is possible to have a continuously repeated checking of the motor sensor calibration. The frequent activation of the sensor 61 is favourable also in that the operation of the sensor 61 itself is repeatedly checked. This means in turn that there is a good safety against malfunction of the important extreme end position indications which are to be detected by the same sensor 61, as described above. This means a high level of safety against hazardous over-steering of the vehicle.

Moreover, the rotation sensor on the servo motor 56 in combination with the micro processor control of the system operation also makes it possible to incorporate other operation safety features. In the described example, the signal corresponding to the propulsion motor speed is derived from the motor drive means of the control unit 58 and is used to adapt the accessible steering interval to the vehicle speed, such that an increasing vehicle speed provides a narrowed accessible steering interval. This means an increased safety against vehicle overturning.

The control unit micro processor is also programmed to provide "soft" end position stops, which means that the steering movement is successively slowed down as an end position of the steering interval is approached. This operation feature too provides a safer handling of the vehicle.

In summary, the two most important advantages of the invention in relation to prior art technique are I) an increased safety against malfunctioning of the calibration and end position detecting means by reducing complexity and employing just one sensor, and II) an improved functioning check of the end position detecting means in that the single sensor is repeatedly and frequently activated at normal use of the power steering system, which also improves operation safety of the system.

It is to be understood that the angular extensions of the open and closed disc portions 64–67,70 and 71, respectively, may be adapted individually to fit the operation characteristics of the actual type of vehicle. In the described example the open portion 64 and the closed portion 65 both have an angular extent of 100 degrees, but in other examples the accessible steering interval of 2×100 degrees may be extended or further limited as determined by the vehicle driving properties and safety regulations. This means that the length of the open portion 64 as well as the location of the open portion 67 may be changed to obtain a desirable and safe steering interval.

The second open portion 67 as well as the second closed portion 66, which are intended for identification purposes only, are illustrated as having a length or angular extent of 12 degrees. It is to be noted, however, that this is just an example suitable for obtaining a safe indication of the extreme end positions having been passed. The length of these portions could very well be varied within an interval of 5–20 degrees.

What is claimed is:

1. Power steering system for a vehicle having at least one steerable wheel (50) movable within a predetermined steering interval (A-Y-B) defined by a first extreme end position (A), a straight-ahead position (Y) and a second extreme end position (B), comprising a servo motor (56) for moving said wheel or wheels (50) within said steering interval (A-Y-B), a wheel position related steering control unit (58), and a wheel position identifying device (55,61) for providing calibrating signals to said control unit (58) in relation to said wheel or wheels (50) occupying either one of said first extreme end position (A), said second extreme end position (B) or said straight-ahead position (Y), said position identifying device (55,61) includes a disc shaped element (55) rotatable about a central axis (X) in unison with said wheel or wheels (50) and provided with a certain pattern of open portions (64,67,70) and closed portions (65,66,71), and an immobile sensing device (61) arranged to deliver signals to said control unit (58) in response to its alignment with said open and closed portions (64–67,70,71) at rotation of said disc shaped element (55), wherein said open portions (64,67,70) are formed by apertures in said disc shaped element (55) disposed at a common radius (Z) from said axis (X), said closed portions (65,66,71) being formed by those parts of said disc shaped element (55) that are located between said apertures (64,67,70) at said common radius (Z), and said sensing device (61) comprises a single sensor (61) located at said common radius (Z), wherein a first one of said apertures (64) defines by its one end said straight-ahead position (Y) and by its other end said first extreme end position (A), a first one of said closed portions (65) extends from said straight-ahead position (Y) to said other extreme end position (B), a second one of said apertures (67) extends from said second extreme end position (B) to a position (D) located less than 10 degrees beyond said second extreme end position (B), a second one of said closed portions (66) extends from said first extreme end position (A) to a position (C) located less than 10 degrees beyond said first extreme end position (A), a third one of said apertures (70) extends over at least 20 degrees from said second closed portion (66), and a third one of said closed portions (71) extends over at least 20 degrees from said second aperture (67).

2. Power steering system according to claim 1, wherein said apertures (64,67,70) are formed by part-circular slots penetrating said disc shaped element (55).

3. Power steering system according to claim 2, wherein said first one of said apertures (64) as well as said first one of said closed portions (65) extend over an angular distance of 100 degrees each.

4. Power steering system according to claim 3, wherein said sensor (61) is of the inductive type.

5. Power steering system according to claim 4, wherein said servo motor (56) is connected to said wheel or wheels via a power steering drive, and said disc shaped element (55) comprises a gear wheel which forms part of the power steering drive.

6. Power steering system according to claim 4, wherein said servo motor (56) includes an angle sensor, and said control unit (58) comprises an angle detecting means connected to said angle sensor and arranged to determine the actual wheel position in relation to anyone of said identified extreme end positions (A,B) or said straight-ahead position (Y).

7. Power steering system according to claim 3, wherein said servo motor (56) is connected to said wheel or wheels via a power steering drive, and said disc shaped element (55) comprises a gear wheel which forms part of the power steering drive.

8. Power steering system according to claim 3, wherein said servo motor (56) includes an angle sensor, and said control unit (58) comprises an angle detecting means connected to said angle sensor and arranged to determine the actual wheel position in relation to anyone of said identified extreme end positions (A,B) or said straight-ahead position (Y).

9. Power steering system according to claim 2, wherein said sensor (61) is of the inductive type.

10. Power steering system according to claim 9, wherein said servo motor (56) is connected to said wheel or wheels via a power steering drive, and said disc shaped element (55) comprises a gear wheel which forms part of the power steering drive.

11. Power steering system according to claim 9, wherein said servo motor (56) includes an angle sensor, and said control unit (58) comprises an angle detecting means connected to said angle sensor and arranged to determine the actual wheel position in relation to anyone of said identified extreme end positions (A,B) or said straight-ahead position (Y).

12. Power steering system according to claim 2, wherein said servo motor (56) is connected to said wheel or wheels via a power steering drive, and said disc shaped element (55) comprises a gear wheel which forms part of the power steering drive.

13. Power steering system according to claim 2, wherein said servo motor (56) includes an angle sensor, and said control unit (58) comprises an angle detecting means connected to said angle sensor and arranged to determine the actual wheel position in relation to anyone of said identified extreme end positions (A,B) or said straight-ahead position (Y).

14. Power steering system according to claim 1, wherein said sensor (61) is of the inductive type.

15. Power steering system according to claim 14, wherein said servo motor (56) is connected to said wheel or wheels via a power steering drive, and said disc shaped element (55) comprises a gear wheel which forms part of the power steering drive.

16. Power steering system according to claim 14, wherein said servo motor (56) includes an angle sensor, and said control unit (58) comprises an angle detecting means connected to said angle sensor and arranged to determine the actual wheel position in relation to anyone of said identified extreme end positions (A,B) or said straight-ahead position (Y).

17. Power steering system according to claim 1, wherein said servo motor (56) is connnected to said wheel or wheels via a power steering drive, and said disc shaped element (55) comprises a gear wheel which forms part of the power steering drive.

18. Power steering system according to claim 1, wherein said servo motor (56) includes an angle sensor, and said control unit (58) comprises an angle detecting means connected to said angle sensor and arranged to determine the actual wheel position in relation to anyone of said identified extreme end positions (A,B) or said straight-ahead position (Y).

* * * * *

UNITED STATES PATENT AND TRADEMARK OFFICE
CERTIFICATE OF CORRECTION

PATENT NO. : 6,256,893 B1 Page 1 of 1
DATED : July 10, 2001
INVENTOR(S) : Carl E.M. Forborgen It is certified that error appears in the above-identified patent and that said Letters Patent is hereby corrected as shown below:

<u>Title page,</u>
Item [56], References Cited, U.S. PATENT DOCUMENTS, insert
-- 4,567,467  1/1986  Wiblin et al. --,
FOREIGN PATENT DOCUMENTS, insert
--       58-93670  A  6/1983  Japan
         58-97568  A  6/1983  Japan --.

Signed and Sealed this

Twenty-second Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,256,893 B1
DATED         : July 10, 2001
INVENTOR(S)   : Carl E.M. Forborgen It is certified that error appears in the above-identified patent and that said Letters Patent is hereby corrected as shown below:

Title page,
Item [56], References Cited, U.S. PATENT DOCUMENTS, insert
-- 4,567,467    1/1986  Wiblin et al. --, FOREIGN PATENT DOCUMENTS, insert
-- 58-93670 A   6/1983  Japan
   58-97568 A   6/1983  Japan --.

Signed and Sealed this

Twenty-ninth Day of October, 2002

Attest:

Attesting Officer

JAMES E. ROGAN
Director of the United States Patent and Trademark Office